(12) United States Patent
McClure et al.

(10) Patent No.: US 11,831,267 B2
(45) Date of Patent: Nov. 28, 2023

(54) SYSTEMS AND METHODS FOR CONTROLLING INVERTER ACTIVE DISCHARGE USING POWER DEVICE SWITCHING LOSSES

(71) Applicant: Delphi Technologies IP Limited, St. Michael (BB)

(72) Inventors: Kirk E. McClure, Kokomo, IN (US); Jim Walters, Carmel, IN (US); Lokesh Gona, Kokomo, IN (US)

(73) Assignee: Delphi Technologies IP Limited, St. Michael (BB)

( * ) Notice: Subject to any disclaimer, the term of this patent is extended or adjusted under 35 U.S.C. 154(b) by 69 days.

(21) Appl. No.: 17/644,688

(22) Filed: Dec. 16, 2021

(65) Prior Publication Data

US 2023/0198449 A1 Jun. 22, 2023

(51) Int. Cl.
*H02P 29/028* (2016.01)
*H02P 27/08* (2006.01)

(52) U.S. Cl.
CPC ............ *H02P 29/028* (2013.01); *H02P 27/08* (2013.01)

(58) Field of Classification Search
CPC .......... H02P 27/00; H02P 27/04; H02P 27/06; H02P 27/08; H02P 27/085; H02P 29/00; H02P 29/024; H02P 29/0243; H02P 29/025; H02P 29/026; H02P 29/027; H02P 29/028; H02P 29/032; H02P 21/00; H02P 21/14; H02P 21/22; H02P 23/00; H02P 23/07; H02P 23/14; H02P 23/28; H02P 25/00; H02P 25/03; H02P 25/032; H02P 25/062; H02P 25/064; H02P 25/10; H02P 11/00; H02P 11/04; H02P 11/06; H02P 6/00; H02P 6/085; H02P 6/28; H02P 1/00; H02P 1/04;

(Continued)

(56) References Cited

U.S. PATENT DOCUMENTS

| 10,924,001 B2 * | 2/2021 | Li ....................... H02M 5/4585 |
| 2017/0355267 A1 | 12/2017 | Zhou et al. |
| 2018/0236874 A1 * | 8/2018 | Tsukada ................ B60L 3/0007 |

FOREIGN PATENT DOCUMENTS

| DE | 102019218881 A1 | 6/2021 |
| WO | 2017186436 A1 | 11/2017 |

OTHER PUBLICATIONS

Lei Jin, "DC Bus Capacitor Discharge of Permanent Magnet Synchronous Machine Drive Systems for Hybrid/Electric Vehicles", Thesis submitted to Oregon State University, 2015 (92 pages).

(Continued)

*Primary Examiner* — Antony M Paul
(74) *Attorney, Agent, or Firm* — Joshua M. Haines; Bookoff McAndrews, PLLC

(57) ABSTRACT

A system includes a controller for a direct-current (DC) to alternating current (AC) inverter, the controller comprising: a memory configured to store instructions; and at least one processor configured to execute the stored instructions to perform operations including: generating a fault condition Pulse-Width Modulated (PWM) signal to control an active discharge of the inverter in a fault condition by alternately: turning on a first switch group of the inverter while turning off a second switch group of the inverter, and turning on the second switch group of the inverter while turning off the first switch group of the inverter.

20 Claims, 6 Drawing Sheets

(58) Field of Classification Search
CPC ...... H02P 1/24; H02P 1/26; H02P 1/42; H02P 1/46; H02P 3/22; H02P 7/29
See application file for complete search history.

(56) References Cited

OTHER PUBLICATIONS

1 International Search Report and Written Opinion in PCT/EP2022/086008, dated Mar. 16, 2023 (9 pages).

* cited by examiner

SYSTEMS AND METHODS FOR CONTROLLING INVERTER ACTIVE DISCHARGE USING POWER DEVICE SWITCHING LOSSES

TECHNICAL FIELD

Various embodiments of the present disclosure relate generally to systems and methods for controlling an active discharge of an inverter, and, more particularly, to systems and methods for controlling an active discharge of an inverter using power device switching losses.

INTRODUCTION

Inverters, such as those used to drive a motor in an electric vehicle, for example, are responsible for converting High Voltage Direct Current (HVDC) into Alternating Current (AC) to drive the motor. A basic three phase inverter includes a bridge with six power device switches (for example, power transistors such as IGBT) that are controlled by Pulse Width Modulation (PWM) signals generated by a microcontroller.

As a result of systems design, a significant amount of energy may be stored on the high voltage bus bulk/DC link capacitor of the inverter. This stored high voltage energy must be dissipated to prevent human exposure to dangerous voltage levels. A function of inverters called "active discharge" allows for the controlled dissipation of the stored energy in the system capacitance. A high voltage battery providing energy to the inverter is disconnected prior to initiating active discharge of the bus to avoid discharging the battery. The active discharge function has the ability to quickly dissipate high voltage bus energy for safety in events such as vehicle service, vehicle crash, and the like. The rate of discharge is a function of initial bus voltage, capacitance, and the energy dissipation mechanism. Government/OEM regulations also dictate what discharge rates are required.

SUMMARY OF THE DISCLOSURE

In some aspects, the techniques described herein relate to a system including a controller for a direct-current (DC) to alternating current (AC) inverter, the controller including: a memory configured to store instructions; and at least one processor configured to execute the stored instructions to perform operations including: generating a fault condition Pulse-Width Modulated (PWM) signal to control an active discharge of the inverter in a fault condition in a first manner by alternately: turning on a first switch group of the inverter while turning off a second switch group of the inverter, and turning on the second switch group of the inverter while turning off the first switch group of the inverter.

In some aspects, the techniques described herein relate to a system, wherein upon detecting that the second switch group of the inverter is faulted, the fault condition Pulse-Width Modulated (PWM) signal is generated to control the active discharge of the inverter in the fault condition in a second manner by alternately turning on and off the first switch group of the inverter while the second switch group of the inverter remains off.

In some aspects, the techniques described herein relate to a system, wherein the operations further include: detecting that the second switch group of the inverter is faulted.

In some aspects, the techniques described herein relate to a system, wherein a frequency of the fault condition PWM signal is adjustable from 5 kHz to 25 kHz.

In some aspects, the techniques described herein relate to a system, wherein the fault condition PWM signal is configured to reduce a voltage of the inverter from approximately 475 V to approximately 60 V in approximately 1.48 seconds.

In some aspects, the techniques described herein relate to a system, wherein: the first switch group of the inverter includes one or more of an upper first phase switch, an upper second phase switch, and an upper third phase switch, and the second switch group of the inverter includes one or more of a lower first phase switch, a lower second phase switch, and a lower third phase switch.

In some aspects, the techniques described herein relate to a system, wherein switches of the first switch group of the inverter and the second switch group of the inverter include one or more of metal-oxide-semiconductor field-effect transistors (MOSFETs), bipolar junction transistors (BJTs), insulated-gate bipolar transistors (IGBTs), or relays.

In some aspects, the techniques described herein relate to a system, further including: the inverter; a set of input terminals configured to receive DC power from a DC power supply; the first switch group and the second switch group configured to receive a normal condition PWM signal to generate AC power; and a set of output terminals configured to output the generated AC power, wherein the inverter is configured to generate the normal condition PWM signal to operate the first switch group and the second switch group.

In some aspects, the techniques described herein relate to a system, wherein the inverter is configured to receive the DC power and generate the AC power; and the system further includes: a motor configured to receive the generated AC power from the inverter, and to rotate based on the received AC power.

In some aspects, the techniques described herein relate to a system, the operations further including: detecting a fault condition in the system, disconnecting the DC power supply from the inverter, and generating the fault condition PWM signal to control the active discharge of the inverter using power device switching losses of the first switch group of the inverter and the second switch group of the inverter.

In some aspects, the techniques described herein relate to a method for controlling a direct-current (DC) to alternating current (AC) inverter, the method including performing, by at least one processor, operations including: generating a fault condition Pulse-Width Modulated (PWM) signal to control an active discharge of the inverter in a fault condition in a first manner by alternately: turning on a first switch group of the inverter while turning off a second switch group of the inverter, and turning on the second switch group of the inverter while turning off the first switch group of the inverter.

In some aspects, the techniques described herein relate to a method, wherein upon detecting that the second switch group of the inverter is faulted, the fault condition Pulse-Width Modulated (PWM) signal is generated to control the active discharge of the inverter in the fault condition in a second manner by alternately turning on and off the first switch group of the inverter while the second switch group of the inverter remains off.

In some aspects, the techniques described herein relate to a method, wherein the operations further include: detecting that the second switch group of the inverter is faulted.

In some aspects, the techniques described herein relate to a method, wherein a frequency of the fault condition PWM signal is adjustable from 5 kHz to 25 kHz.

In some aspects, the techniques described herein relate to a method, wherein: the first switch group of the inverter includes one or more of a first phase switch, a second phase switch, and a third phase switch, and the second switch group of the inverter includes one or more of a first phase switch, a second phase switch, and a third phase switch.

In some aspects, the techniques described herein relate to a method, wherein turning on a first switch group of the inverter while turning off a second switch group of the inverter includes turning on only a number of phase switches less than a total number of phase switches of the first switch group while turning off the second switch group, and wherein turning on the second switch group of the inverter while turning off the first switch group of the inverter includes turning on only a number of phase switches less than a total number of phase switches of the second switch group while turning off the first switch group.

In some aspects, the techniques described herein relate to a method, further including: receiving, by a set of input terminals of the inverter, DC power from a DC power supply; generating, by the inverter, a normal condition PWM signal to operate the first switch group and the second switch group; receiving, by the first switch group and the second switch group, a normal condition PWM signal to generate AC power; and outputting, by a set of output terminals of the inverter, the generated AC power.

In some aspects, the techniques described herein relate to a method, further including: by a motor, receiving the generated AC power output from the inverter and rotating based on the received AC power.

In some aspects, the techniques described herein relate to a method, the operations further including: detecting a fault condition in one or more of the DC power supply, the inverter, or the motor, disconnecting the DC power supply from the inverter, and generating the fault condition PWM signal to control the active discharge of the inverter using power device switching losses of the first switch group of the inverter and the second switch group of the inverter.

In some aspects, the techniques described herein relate to a system including a controller for a direct-current (DC) to alternating current (AC) inverter, the controller including: a memory configured to store instructions; and at least one processor configured to execute the stored instructions to perform operations including: generating a fault condition Pulse-Width Modulated (PWM) signal to control an active discharge of the inverter in a fault condition by alternately turning on and off a first switch group of the inverter while a second switch group of the inverter remains off.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
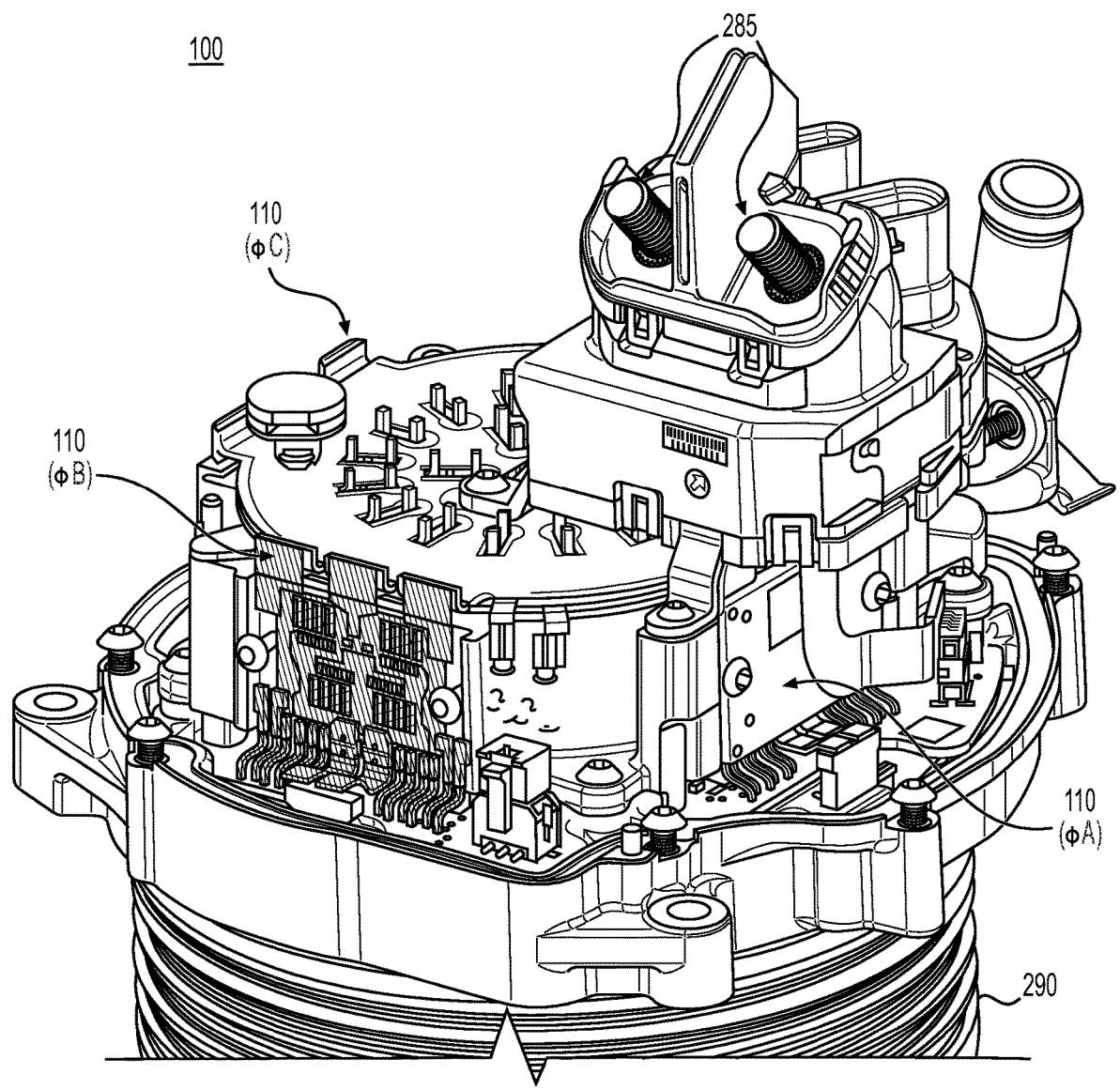
FIG. 1 depicts an inverter, according to one or more embodiments.

Various embodiments of the present disclosure relate generally to systems and methods for controlling an active discharge of an inverter, and, more particularly, to systems and methods for controlling an active discharge of an inverter using power device switching losses.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. For example, in the context of the disclosure, the switching devices Q1-Q6 may be described as switches or devices, but may refer to any device capable of controlling the flow of power in an electrical circuit. For example, devices Q1-Q6 may be metal-oxide-semiconductor field-effect transistors (MOSFETs), bipolar junction transistors (BJTs), insulated-gate bipolar transistors (IGBTs), or relays, for example, or any combination thereof, but are not limited thereto.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

One approach for active discharge uses a resistive element or a resistive bank that can handle energy dissipation required to perform active discharge within a safe duration. A control device is responsible for making decisions to perform and monitor the active discharge process.

Another active discharge approach utilizes motor windings to discharge the energy. A microcontroller with an algorithm for precise control of the current through windings without rotating the motor makes it possible to discharge the energy. This approach discharges the bus very quickly. However, system faults can prevent precise motor control which may cause active discharge failure.

Accordingly, an inverter may use switching losses in the inverter power device switches (IGBT/FET) to discharge energy. Controlling the power devices on/off (also referred to as enabling/disabling) creates losses that can be predicted. Switching numerous times at a high frequency rate will contribute to a significant amount of these accumulated losses. A rate of the discharge (losses) may be proportional to the switching frequency. These losses can be used to discharge the HVDC bus quickly, without the added cost and complexity of traditional methods. Additionally, by eliminating the resistive element from traditional approaches, substantial cost, circuit board area, and unwanted heat can be saved.

Figure 2:
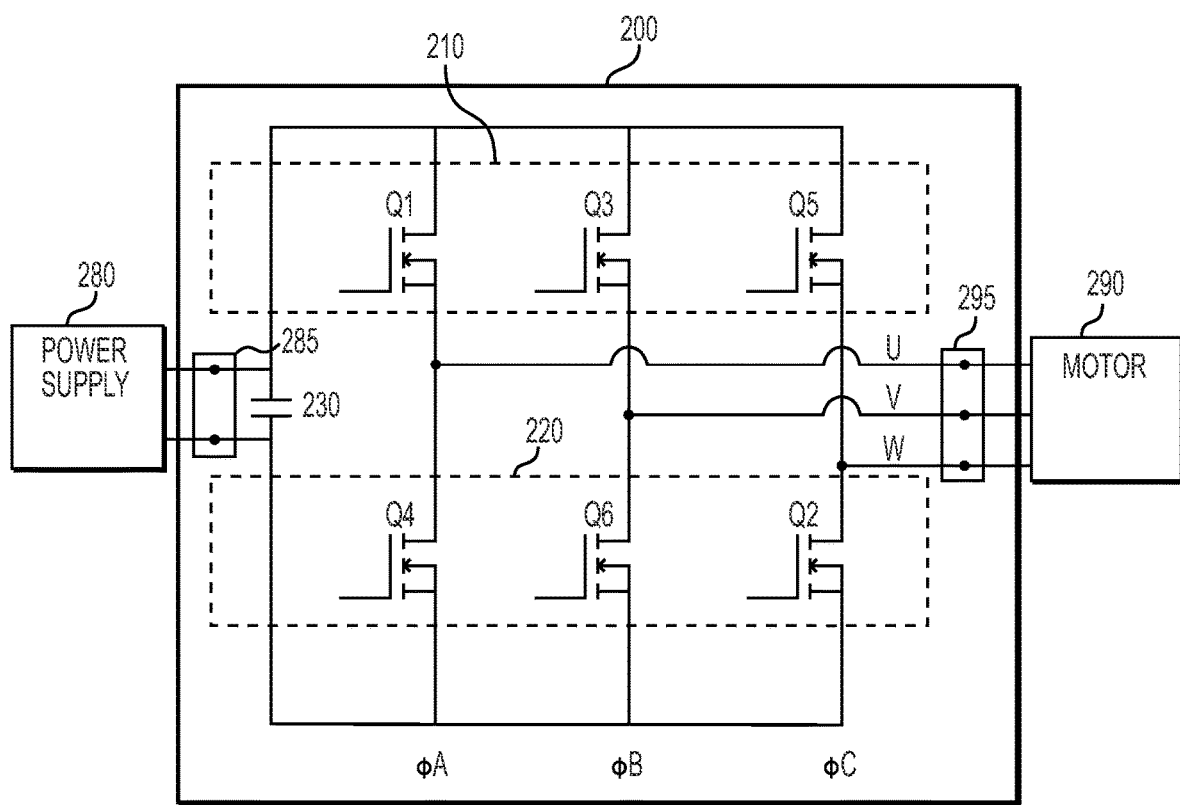
FIG. 2 depicts an electrical power schematic of an inverter in a connected system, according to one or more embodiments.

FIG. 1 depicts an inverter, according to one or more embodiments. FIG. 2 depicts an electrical power schematic of an inverter, according to one or more embodiments. The inverter may be used to convert DC power from a battery in an electric vehicle to AC power, to drive an electric motor of the electric vehicle, for example, but the embodiments are not limited thereto. Additionally, the inverter may be bidirectional, and used to convert DC power to AC power, or to convert AC power to DC power.

As shown in FIGS. 1 and 2, an inverter 100 may include heat sink 110 and power board 200, and may be connected to a DC power supply 280 and a motor 290. Power board 200 may include first three-phase switch group 210, and second three-phase switch group 220. A first phase (OA) may include switches Q1 and Q4, a second phase (ctB) may include switches Q3 and Q6, and a third phase (ctC) may include switches Q5 and Q2, as illustrated in FIG. 2. First three-phase switch group 210 may include first phase switch Q1, second phase switch Q3, and third phase switch Q5. Second three-phase switch group 220 may include first phase switch Q4, second phase switch Q6, and third phase switch Q2. Switches Q1-Q6 may be metal-oxide-semiconductor field-effect transistors (MOSFET), for example, but are not limited thereto.

The first three-phase switch group 210 and second three-phase switch group 220 may be driven by a PWM signal generated by inverter controller 300 (shown in FIG. 3) to convert DC power delivered via the set of input terminals 285 at capacitor 230 to three phase AC power at outputs U, V, and W (correlating with phases A, B, and C, respectively) via the set of output terminals 295 to motor 290. Additionally, although FIGS. 1 and 2 illustrate a three-phase inverter, the disclosure is not limited thereto, and may include single phase or multi-phase inverters.

The inputs to the motor 290 can effectively be connected to the upper or lower rail of the DC link capacitor 230 and DC power supply 280, which effectively provides no voltage to the motor 290. This condition is called a Three Phase Short (3PS). The 3PS of first three-phase switch group 210 and second three-phase switch group 220 may be performed by turning on either the first three-phase switch group 210 or the second three-phase switch group 220. Both the first (upper) and second (lower) devices of any phase should and will not be on at the same time, as this will cause a short of positive and negative terminals of the high voltage bus. A 3PS safe state will not cause any current (OA) while the motor 290 is not in rotation. There are two primary approaches to perform active discharge with the 3PS scheme.

The first approach may switch between turning on the first three-phase switch group 210 while turning off the second three-phase switch group 220, and turning on the second three-phase switch group 220 while turning off the first three-phase switch group 210. Because the switching is not instantaneous, a delay may be introduced between turning on and off (and off and on) the switch groups to ensure that the first (upper) and second (lower) devices of any phase are not on at the same time. This delay may be approximately 1 microsecond, but the disclosure is not limited thereto. The first approach may be faster than the second approach, described below, based on using both the first three-phase switch group 210 and the second three-phase switch group 220, and may create twice the loss effect compared to the second approach.

The second approach may switch between turning on either the first three-phase switch group 210 or the second three-phase switch group 220, and turning off all of the first three-phase switch group 210 and the second three-phase switch group 220. The rate of discharge with the second approach may be slower relative to the first approach because only one side of the bridge is being turned on. However, the second approach may be useful as a back-up approach to the active discharge scheme if a failure such as an open switch occurs, or if only one switch group can be used due to any type of failure.

A third approach may dissipate the energy by switching only less than an entirety of the phase switches of the first three-phase switch group 210 and the second three-phase switch group 220 on and off. The third approach may also be stated as turning on and off only a number of phase switches less than a total number of phase switches of the first three-phase switch group 210 and the second three-phase switch group 220.

For example, the third approach may turn on only two phase switches of the first three-phase switch group 210 while turning off the second three-phase switch group 220, or turning on only two corresponding phase switches of the second three-phase switch group 220 while turning off the first three-phase switch group 210. The third approach may be useful as a back-up approach to the active discharge scheme if a failure such as a shorted switch occurs. For example, if φA switch Q4 is shorted and cannot be turned off, turning on corresponding φA switch Q1 may cause a short of positive and negative terminals of the high voltage bus. Accordingly, in this example, the third approach may use switching losses of φB and φC devices without using OA.

Additionally, if two phase switches are shorted of either the first three-phase switch group 210 or the second three-phase switch group 220, the third approach may turn on only one phase switch of the first three-phase switch group 210 while turning off the second three-phase switch group 220, or turn on only one corresponding phase switch of the second three-phase switch group 220 while turning off the first three-phase switch group 210.

Phase switches of the first three-phase switch group 210 or the second three-phase switch group 220 may be turned on and off in various combinations. For example, φA switch Q1, φB switch Q6, and φC switch Q5 may be turned on while φA switch Q4, φB switch Q3, and φC switch Q2 are turned off, and vice versa. Furthermore, in the context of the disclosure, a group may include one or more power devices. As shown, the disclosure includes any combination of turning on and off power devices in the inverter 100 to control an active discharge of the inverter 100 using power device switching losses, as long as a short of positive and negative terminals of the high voltage bus is avoided.

Inverter controller 300 may include one or more controllers to generate the PWM signal during a normal condition of the inverter and perform the 3PS of first three-phase switch group 210 and second three-phase switch group 220 during a fault condition of the inverter. For example, a first inverter controller of inverter controller 300 may generate the PWM signal during a normal condition of the inverter, and a second inverter controller of inverter controller 300 may perform the 3PS of first three-phase switch group 210 and second three-phase switch group 220 during a fault condition of the inverter. However, the disclosure is not limited thereto, and only one inverter controller of inverter controller 300 may generate a PWM signal during a normal condition of the inverter and perform the 3PS of first three-phase switch group 210 and second three-phase switch group 220 during a fault condition of the inverter.

Figure 3:
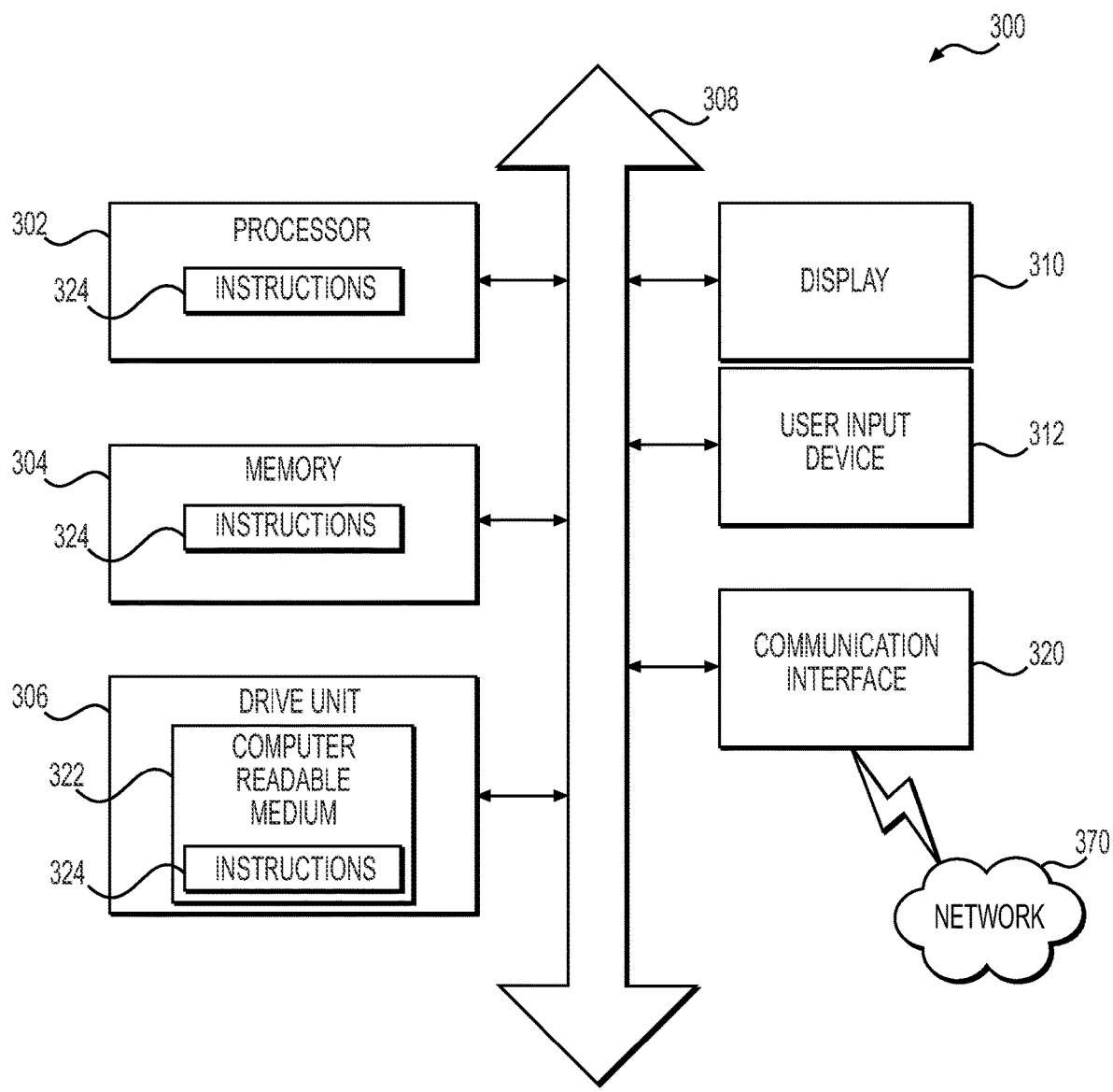
FIG. 3 depicts an implementation of a computer system that may execute techniques presented herein, according to one or more embodiments.

FIG. 3 depicts an implementation of an inverter controller 300 that may execute techniques presented herein, according to one or more embodiments.

The inverter controller 300 may include a set of instructions that can be executed to cause the inverter controller 300 to perform any one or more of the methods or computer-based functions disclosed herein. The inverter controller 300 may operate as a standalone device or may be connected, e.g., using a network, to other computer systems or peripheral devices.

In a networked deployment, the inverter controller 300 may operate in the capacity of a server or as a client in a server-client user network environment, or as a peer computer system in a peer-to-peer (or distributed) network environment. The inverter controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the inverter controller 300 can be implemented using electronic devices that provide voice, video, or data communication. Further, while the inverter controller 300 is illustrated as a single system, the term "system" shall also be taken to include any collection of systems or sub-systems that individually or jointly execute a set, or multiple sets, of instructions to perform one or more computer functions.

As illustrated in FIG. 3, the inverter controller 300 may include a processor 302, e.g., a central processing unit (CPU), a graphics processing unit (GPU), or both. The processor 302 may be a component in a variety of systems. For example, the processor 302 may be part of a standard inverter. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The inverter controller 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the inverter controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the inverter controller 300 may include an input device 312 configured to allow a user to interact with any of the components of inverter controller 300. The input device 312 may be a number pad, a keyboard, or a cursor control device, such as a mouse, or a joystick, touch screen display, remote control, or any other device operative to interact with the inverter controller 300.

The inverter controller 300 may also or alternatively include drive unit 306 implemented as a disk or optical drive. The drive unit 306 may include a computer-readable medium 322 in which one or more sets of instructions 324, e.g. software, can be embedded. Further, the instructions 324 may embody one or more of the methods or logic as described herein. The instructions 324 may reside completely or partially within the memory 304 and/or within the processor 302 during execution by the inverter controller 300. The memory 304 and the processor 302 also may include computer-readable media as discussed above.

In some systems, a computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in inverter controller 300, or combinations thereof. The connection with the network 370 may be a physical connection, such as a wired Ethernet connection or may be established wirelessly as discussed below. Likewise, the additional connections with other components of the inverter controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The inverter controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 4:
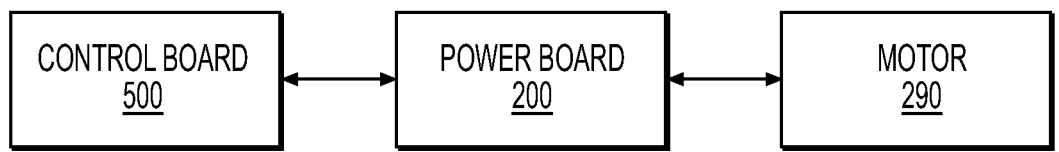
FIG. 4 depicts a connected system including a control board, a power board, and a motor, according to one or more embodiments.

FIG. 4 depicts a connected system including a control board 500, a power board 200, and a motor 290, according to one or more embodiments. The control board 500 may, among other functions, generate a PWM signal and monitor a status of various components. The power board 200 may include the first three-phase switch group 210 and second three-phase switch group 220, which may be driven by the PWM signal generated by inverter controller 300 to convert DC power delivered via the set of input terminals 285 at capacitor 230 to three phase AC power at outputs U, V, and W via the set of output terminals 295 to motor 290. However, the disclosure is not limited thereto, and components and functions of the control board 500 and power board 200 may be provided on either or both of the control board 500 and power board 200. Additionally, the control board 500 and power board 200 may be provided as one or more boards.

Figure 5:
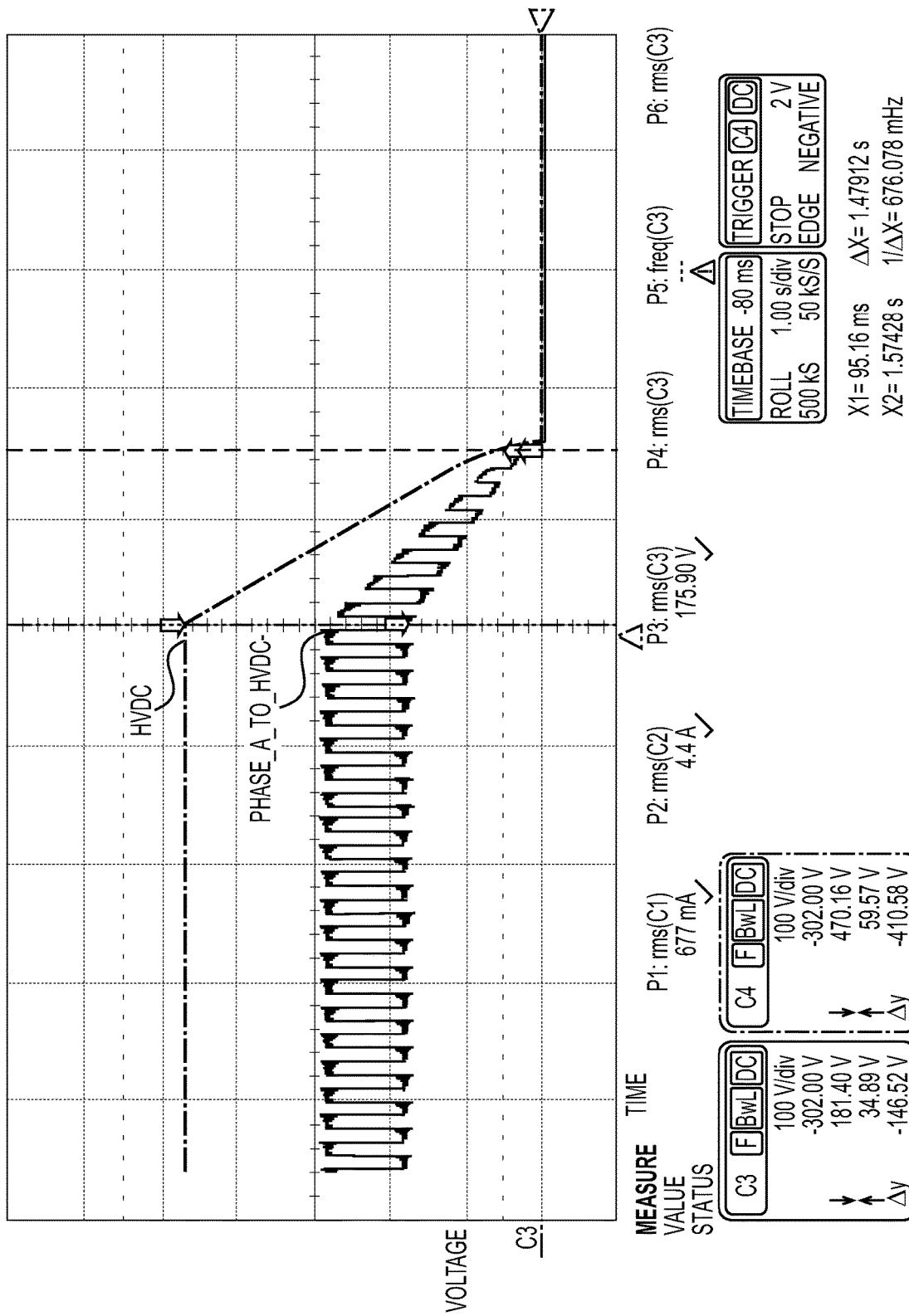
FIG. 5 depicts a graph of voltage over time of an inverter high voltage bus by controlling an active discharge of the inverter using power device switching losses, according to one or more embodiments.

FIG. 5 depicts a graph of voltage over time of an inverter high voltage bus by controlling an active discharge of the inverter using power device switching losses, according to one or more embodiments. In FIG. 5, the phase A to HVDC includes an oscilloscope aliasing effect that represents the switching, but may not be representative of the actual frequency of switching that occurs.

As shown in FIG. 5, an active discharge is performed by using power device switching losses using the first approach discussed above, which may switch between turning on the first three-phase switch group 210 while turning off the second three-phase switch group 220, and turning on the second three-phase switch group 220 while turning off the first three-phase switch group 210 at a predetermined rate of 10 kHz, for example, or at an adjustable rate. A frequency of the fault condition PWM signal may be adjustable based on the desired discharge duration, capacitance on the bus, and the switches being used, as these can vary between systems. The frequency of the fault condition PWM signal may be adjusted from 5 kHz to 25 kHz, for example, and may also be fixed at a predetermined value, such as 20 kHz, for example. A duration of approximately 1.48 seconds to reduce the voltage on the high voltage bus from a higher voltage, such as approximately 475V or 800V, for example, to a lower voltage, such as approximately 60V, for example, that is safer for humans, after the HVDC supply was disconnected may be sufficient, and may be adjusted by changing control parameters. For example, higher and lower voltages, specific decay rates, durations, and safe voltage regions may be adjustable and may be dictated by government or OEM requirements.

Figure 6:
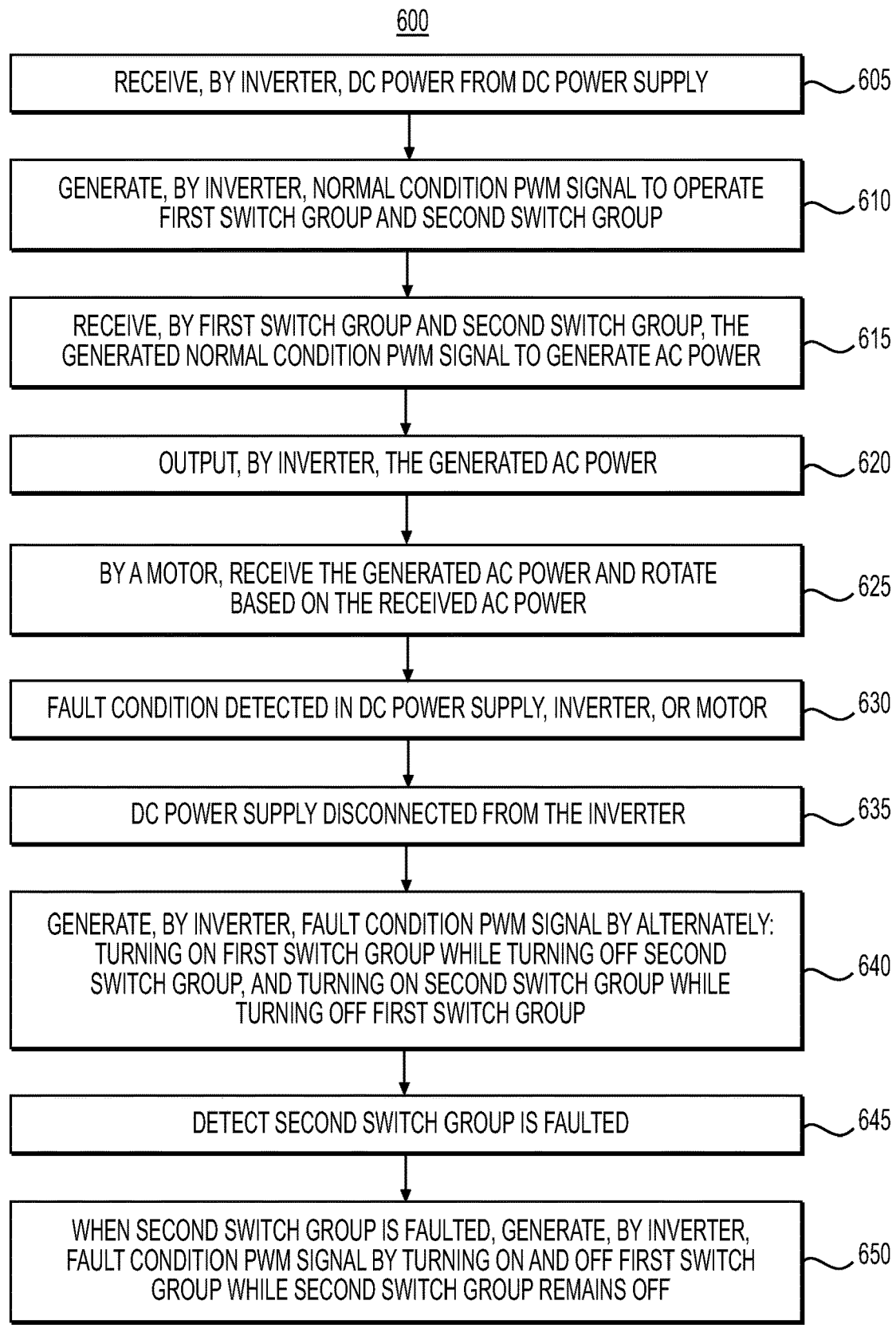
FIG. 6 depicts a method for controlling a direct-current (DC) to alternating current (AC) inverter, according to one or more embodiments.

FIG. 6 depicts a method 600 for controlling a direct-current (DC) to alternating current (AC) inverter 100, according to one or more embodiments.

In operation 605, the inverter 100 may receive, by a set of input terminals 285 of the inverter 100, DC power from a DC power supply 280.

In operation 610, the inverter 100 may generate a normal condition PWM signal to operate the first three-phase switch group 210 and the second three-phase switch group 220.

In operation 615, the first three-phase switch group 210 and the second three-phase switch group 220 may receive the generated normal condition PWM signal to generate AC power.

In operation 620, the inverter may output, by a set of output terminals 295 of the inverter 100, the generated AC power.

In operation 625, a motor 290 may receive the generated AC power from the inverter 100, and rotate based on the received AC power.

In operation 630, a fault condition may be detected in one or more of the DC power supply 280, the inverter 100, or the motor 290. A fault condition may refer to any event requiring quick discharge of the HVDC bus. For example, if the inverter is used in a vehicle, application faults related to battery packs, motors, or isolation can occur. In addition, faults related to controls (e.g. overcurrent), gate circuitry (e.g. UVLO), with devices themselves (e.g. DESAT), and/or processor or software faults can occur.

In operation 635, the DC power supply 280 may be disconnected from the inverter 100, such as with the use of a contactor at or replacing input terminals 285.

In operation 640, the inverter controller 300 may generate a fault condition PWM signal to control an active discharge of the inverter 100 in a fault condition by alternately: turning on a first three-phase switch group 210 of the inverter 100 while turning off a second three-phase switch group 220 of the inverter 100, and turning on the second three-phase switch group 220 of the inverter while turning off the first three-phase switch group 210 of the inverter.

In operation 645, the inverter controller 300 may detect that the second three-phase switch group 220 of the inverter 100 is faulted. The fault may be a shorted or open switch, or any type of failure that necessitates using only one switch group.

In operation 650, when the second three-phase switch group 220 of the inverter 100 is faulted, the inverter controller 300 may generate the fault condition Pulse-Width Modulated (PWM) signal to alternately turn on and off the first three-phase switch group 210 of the inverter 100 while the second three-phase switch group 220 of the inverter 100 remains off. Alternatively, when the first three-phase switch group 210 of the inverter 100 is faulted, the inverter controller 300 may generate the fault condition Pulse-Width Modulated (PWM) signal to alternately turn on and off the second three-phase switch group 220 of the inverter 100 while the first three-phase switch group 210 of the inverter 100 remains off.

According to an embodiment, the inverter 100 does not use a resistive element or a resistive bank for the active discharge of the inverter 100. According to an embodiment, the inverter 100 does not use windings of motor 290 for the active discharge of the inverter 100. According to an embodiment, the energy dissipated by power device switching losses of the inverter 100 is much greater than energy dissipated by windings of motor 290.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system including a controller for a direct-current (DC) to alternating current (AC) inverter, the controller comprising:
   a memory configured to store instructions; and
   at least one processor configured to execute the stored instructions to perform operations including:
      generating a fault condition Pulse-Width Modulated (PWM) signal to control an active discharge of the inverter in a fault condition in a first manner by alternately:
         turning on a first switch group of the inverter while turning off a second switch group of the inverter, and
         turning on the second switch group of the inverter while turning off the first switch group of the inverter.

2. The system of claim 1, wherein upon detecting that the second switch group of the inverter is faulted, the fault condition Pulse-Width Modulated (PWM) signal is generated to control the active discharge of the inverter in the fault condition in a second manner by alternately turning on and off the first switch group of the inverter while the second switch group of the inverter remains off.

3. The system of claim 1, wherein the operations further include:
   detecting that the second switch group of the inverter is faulted.

4. The system of claim 1, wherein a frequency of the fault condition PWM signal is adjustable from 5 kHz to 25 kHz.

5. The system of claim 1, wherein the fault condition PWM signal is configured to reduce a voltage of the inverter from approximately 475 V to approximately 60 V in approximately 1.48 seconds.

6. The system of claim 1, wherein:
the first switch group of the inverter includes one or more of an upper first phase switch, an upper second phase switch, and an upper third phase switch, and
the second switch group of the inverter includes one or more of a lower first phase switch, a lower second phase switch, and a lower third phase switch.

7. The system of claim 1, wherein switches of the first switch group of the inverter and the second switch group of the inverter include one or more of metal-oxide-semiconductor field-effect transistors (MOSFETs), bipolar junction transistors (BJTs), insulated-gate bipolar transistors (IGBTs), or relays.

8. The system of claim 1, further comprising:
the inverter;
a set of input terminals configured to receive DC power from a DC power supply;
the first switch group and the second switch group configured to receive a normal condition PWM signal to generate AC power; and
a set of output terminals configured to output the generated AC power,
wherein the inverter is configured to generate the normal condition PWM signal to operate the first switch group and the second switch group.

9. The system of claim 8,
wherein the inverter is configured to receive the DC power and generate the AC power; and
the system further comprises:
a motor configured to receive the generated AC power from the inverter, and to rotate based on the received AC power.

10. The system of claim 9, the operations further including:
detecting a fault condition in the system,
disconnecting the DC power supply from the inverter, and
generating the fault condition PWM signal to control the active discharge of the inverter using power device switching losses of the first switch group of the inverter and the second switch group of the inverter.

11. A method for controlling a direct-current (DC) to alternating current (AC) inverter, the method comprising performing, by at least one processor, operations including:
generating a fault condition Pulse-Width Modulated (PWM) signal to control an active discharge of the inverter in a fault condition in a first manner by alternately:
turning on a first switch group of the inverter while turning off a second switch group of the inverter, and
turning on the second switch group of the inverter while turning off the first switch group of the inverter.

12. The method of claim 11, wherein upon detecting that the second switch group of the inverter is faulted, the fault condition Pulse-Width Modulated (PWM) signal is generated to control the active discharge of the inverter in the fault condition in a second manner by alternately turning on and off the first switch group of the inverter while the second switch group of the inverter remains off.

13. The method of claim 11, wherein the operations further include:
detecting that the second switch group of the inverter is faulted.

14. The method of claim 11, wherein a frequency of the fault condition PWM signal is adjustable from 5 kHz to 25 kHz.

15. The method of claim 11, wherein:
the first switch group of the inverter includes one or more of a first phase switch, a second phase switch, and a third phase switch, and
the second switch group of the inverter includes one or more of a first phase switch, a second phase switch, and a third phase switch.

16. The method of claim 15, wherein turning on a first switch group of the inverter while turning off a second switch group of the inverter includes turning on only a number of phase switches less than a total number of phase switches of the first switch group while turning off the second switch group, and
wherein turning on the second switch group of the inverter while turning off the first switch group of the inverter includes turning on only a number of phase switches less than a total number of phase switches of the second switch group while turning off the first switch group.

17. The method of claim 11, further comprising:
receiving, by a set of input terminals of the inverter, DC power from a DC power supply;
generating, by the inverter, a normal condition PWM signal to operate the first switch group and the second switch group;
receiving, by the first switch group and the second switch group, a normal condition PWM signal to generate AC power; and
outputting, by a set of output terminals of the inverter, the generated AC power.

18. The method of claim 17, further comprising:
by a motor, receiving the generated AC power output from the inverter and rotating based on the received AC power.

19. The method of claim 18, the operations further including:
detecting a fault condition in one or more of the DC power supply, the inverter, or the motor,
disconnecting the DC power supply from the inverter, and
generating the fault condition PWM signal to control the active discharge of the inverter using power device switching losses of the first switch group of the inverter and the second switch group of the inverter.

20. A system including a controller for a direct-current (DC) to alternating current (AC) inverter, the controller comprising:
a memory configured to store instructions; and
at least one processor configured to execute the stored instructions to perform operations including:
generating a fault condition Pulse-Width Modulated (PWM) signal to control an active discharge of the inverter in a fault condition by alternately turning on and off a first switch group of the inverter while a second switch group of the inverter remains off.

* * * * *